Jan. 21, 1958  G. HOHWART ET AL  2,820,299
ADJUSTABLE SNAP GAGE
Filed July 10, 1953  2 Sheets-Sheet 1
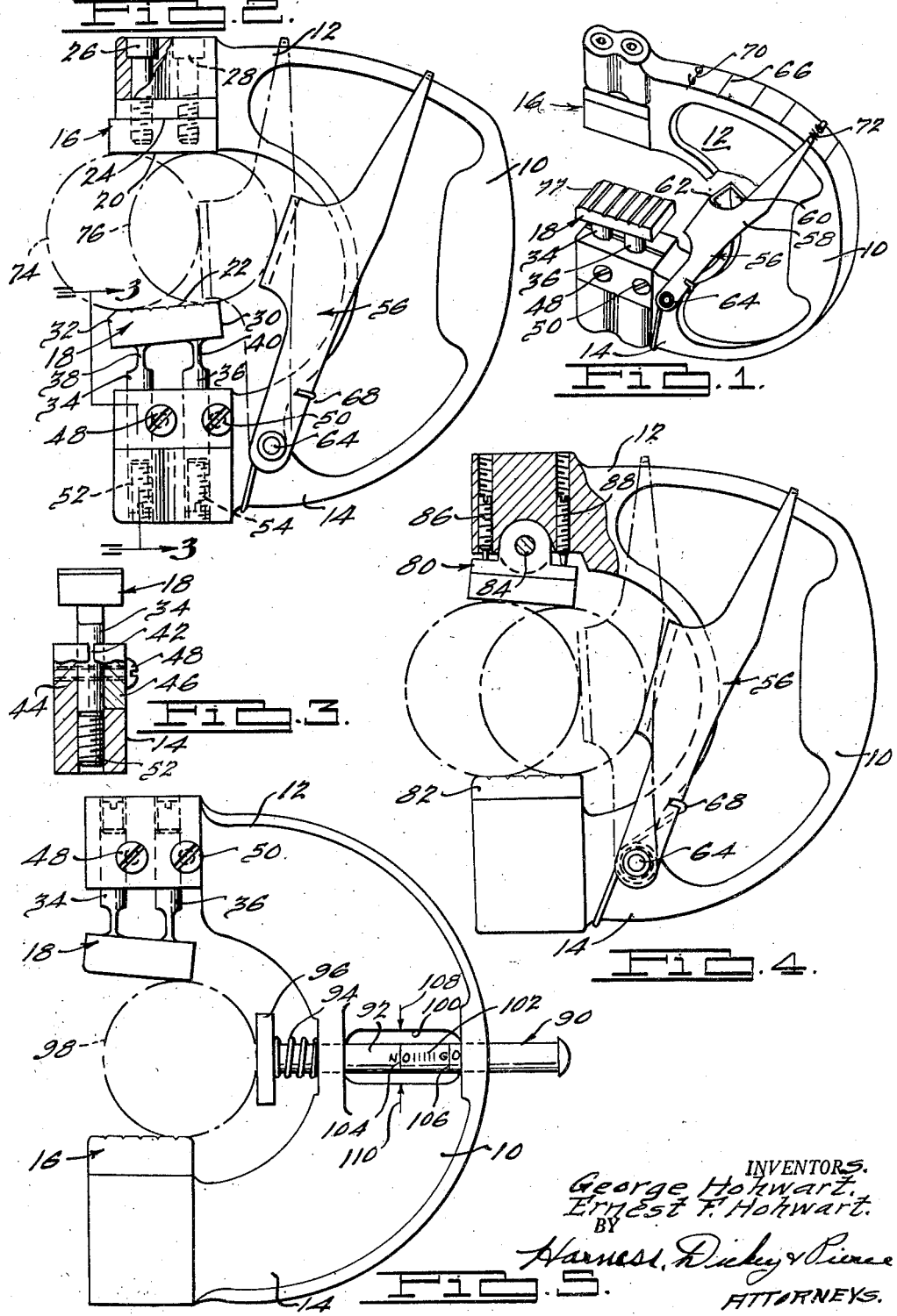
INVENTORS.
George Hohwart.
Ernest F. Hohwart.
BY
Harness, Dickey & Pierce
ATTORNEYS.

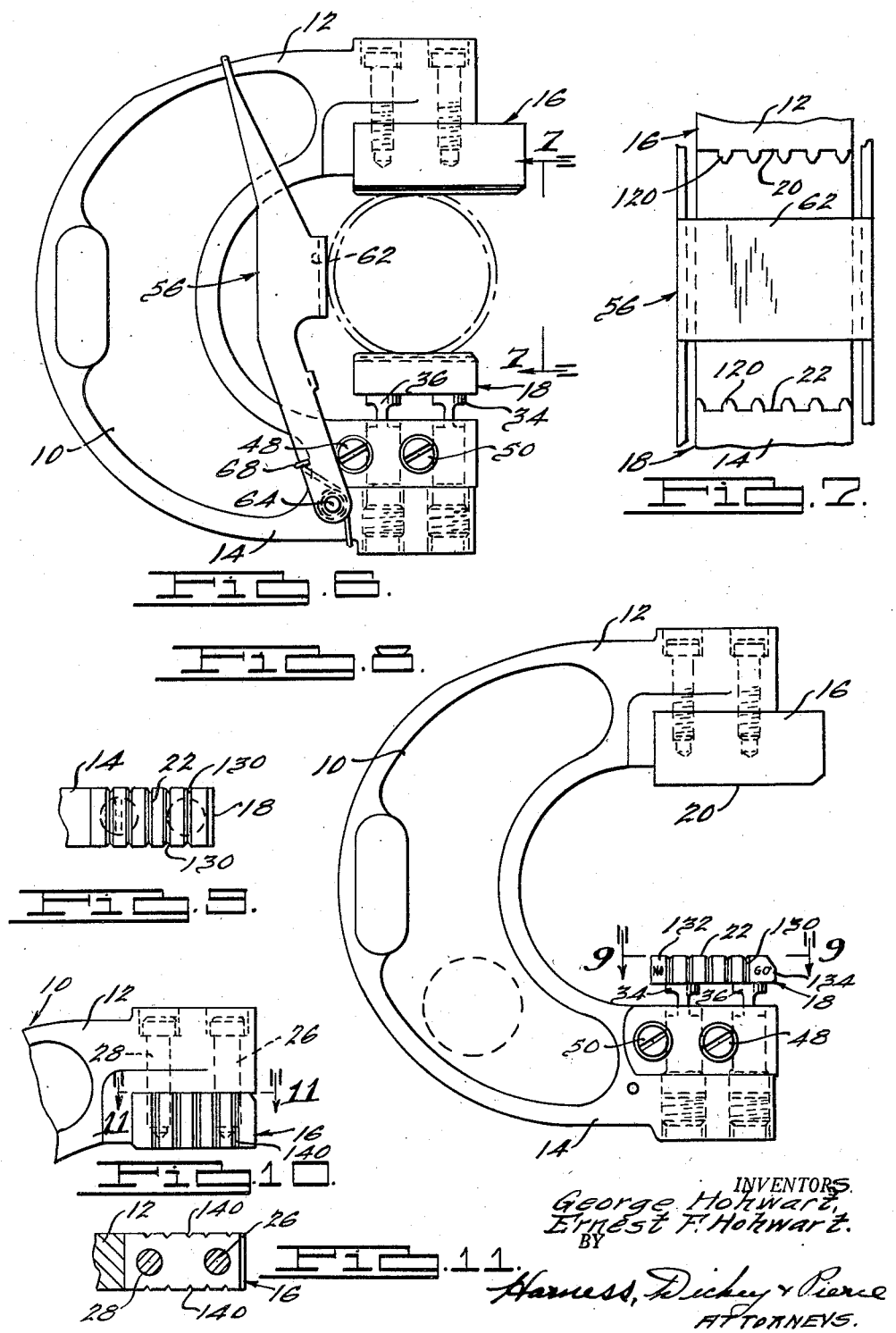

United States Patent Office 2,820,299
Patented Jan. 21, 1958

2,820,299

ADJUSTABLE SNAP GAGE

George Hohwart, Farmington Township, Oakland County, and Ernest F. Hohwart, Detroit, Mich.

Application July 10, 1953, Serial No. 367,246

6 Claims. (Cl. 33—163)

This invention relates to new and useful improvements in adjustable snap gages.

Snap gages are conventionally used to check a workpiece for size. These gages conventionally are equipped with a front set of aligned pins which are precisely spaced apart to the maximum dimensional tolerance permitted for the part and with a rear set of aligned pins which are spaced exactly to the minimum dimensional tolerance permitted for the part. If the workpiece will pass between the front set of pins and will not pass between the rear set of pins the operator knows that the size of the part is within the permissible tolerance range. Parts can be checked exceedingly rapidly in this manner, and snap gages of this type are extensively used.

In recent years, however, machinists have been required by manufacturers to hold the dimension of many parts to much closer tolerances than heretofore, and it has become increasingly necessary to know the actual size of each part within the specified tolerance range. For example, a man operating a grinding machine must know when the work has been ground approximately to the low limit permitted by the specification so that he can make adjustments on the machine and keep the part well within the specified tolerance. Today such operators often use a micrometer in conjunction with a snap gage so as to constantly check the actual size of the part as it is being ground to size.

In order to satisfy the ever increasing need for the machine operator to know the actual size of the part within the permitted tolerance, gage makers have attempted to equip snap gages with visual indicators. In every instance, however, these modified gages have been changed from a simple, easily used instrument to a mechanically complicated piece of equipment which is relatively difficult to use. Also, every special gage of this type within our knowledge is relatively expensive. In general, conventional snap gages equipped with visual indicators cost six or seven times as much as a simple snap gage not so equipped.

An important object of the present invention is to provide a snap gage of novel construction having a visual indicator.

Another object of the invention is to provide a snap gage that is uniquely constructed to show the operator or inspector the actual part size as distinguished from an ordinary snap gage which shows only whether the part is within specified limits.

Still another object of the invention is to provide a snap gage that is adjustable to vary the tolerance range registrable thereby and wherein the visual indicator is uniquely constructed to progressively magnify the indicator reading as the tolerance decreases.

Yet another object of the invention is to provide a snap gage of the above-mentioned character that is essentially simple in construction, efficient in operation, and that can be manufactured at a cost only slightly more than a simple snap gage.

A further object of the invention is to provide a snap gage of the above-mentioned character that is essentially rugged in construction and that can stand shop use much better than conventional snap gages having attached indicators.

Other objects and advantages of the invention will be apparent during the course of the following description.

In the drawings forming a part of the specification and wherein like numerals are employed to designate like parts throughout the same:

Fig. 1 is a perspective view showing a preferred form of the invention;

Fig. 2 is an enlarged side elevational view of the same, parts thereof being broken away and shown in section for clearness of illustration;

Fig. 3 is a fragmentary vertical sectional view taken on the line 3—3 of Fig. 2;

Fig. 4 is a side elevational view showing a modified snap gage construction embodying the invention;

Fig. 5 is a side elevational view showing still another modified form of snap gage embodying the invention;

Fig. 6 is a side elevational view of a modified snap gage construction embodying the invention and particularly adapted for checking external threads on a workpiece;

Fig. 7 is a fragmentary end elevational view looking in the direction of the arrow 7—7 of Fig. 6;

Fig. 8 is a side elevational view of a snap gage embodying the invention and having a modified visual indicating means for registering the size of a workpiece;

Fig. 9 is a fragmentary plan elevational view looking in the direction of the arrows 9—9 of Fig. 8;

Fig. 10 is a fragmentary side elevational view showing still another modified form of visual indicator for the snap gage of this invention; and Fig. 11 is a fragmentary sectional view taken on the line 11—11 of Fig. 10.

Referring now to Figs. 1–3 of the drawings which illustrate a preferred form of the invention, it will be observed that the gage comprises a generally C-shaped body 10 having a spaced upper and lower arm portions 12 and 14. Gage blocks 16 and 18 are mounted on the terminal portions of respective arms 12 and 14 at the inner sides of the arms and directly opposite each other. The flat inner surfaces 20 and 22 of the gage blocks 16 and 18 are thus disposed in opposed confronting relation.

In the form of the invention here shown the upper gage block 16 is fastened solidly to the arm 12 and to this end the arm is formed at the inner side and adjacent the end thereof with a flat supporting surface 24 which seats the flat rear surface of the gage block. Any suitable means can be employed for fastening the gage block 16 to the body. However, it preferably is removable for replacement or resurfacing of the block in the event it is damaged in use, and in the form of the invention shown the block is fastened to the body by a pair of Allen-head screws 26 and 28 which extend downwardly through the arm 12 and into the block.

In accordance with the present invention, it is necessary to mount one of the gage blocks so that it is angularly adjustable relative to the other gage block, and in the embodiment of the invention now under consideration, the lower gage block 18 is the adjustable one. In practice, the lower gage block 18 is positioned with the inner end 30 thereof closer to the gage block 16 than the outer end 32. In order to permit such adjustment, the gage block 18 is provided with a pair of longitudinally spaced downwardly extending studs 34 and 36 which extend into and are slidably received by the supporting lower arm 14 of the gage body 10. The studs 34 and 36 are provided adjacent the gage block 18 with flexible reed portions 38 and 40 respectively which permit the studs to be independently adjusted longitudinally in the supporting arm 14 to tilt the block 18 in the manner described.

Manifestly, the studs 34 and 36 can be attached to the arm 14 in any one of a number of ways. In the form of the invention shown the inner portion of the arm 14 is split longitudinally as at 42 and the studs extend into the split portion of the arm between fixed and movable clamping members 44 and 46. Screws 48 and 50 interconnecting the clamping portions 44 and 46 are tightened to hold the studs 34 and 36 securely in selected, adjusted positions. Adjusting screws 52 and 54 in the arm 14 engage upwardly against the ends of the respective studs 34 and 36, and when the clamping screws 48 and 50 are loosened these adjusting screws can be adjusted to selectively position the studs.

A pivoted indicator arm 56 is fastened to the body 10 for engagement by a workpiece inserted between the gage blocks 16 and 18. The indicator arm here shown comprises a pair of identical, elongated pointers 58 and 60 interconnected at the forward edges thereof by a transverse bridging portion 62. The pointers 58 and 60 straddle the body 10 with the bridging portion 62 disposed at the inner side of the body, as perhaps best shown in Fig. 1. When thus positioned, the pointers 58 and 60 extend from the lower arm portion 14 to which it is attached by a pivot 64 to the outer edge of the upper arm portion 12. The upper outer edge of the arm 12 is provided with a scale 66 and the tip ends of the pointers 58 and 60 are bent inwardly so as to sweep across the scale when the arm 56 is rocked back and forth on the pivot 64. The range of the scale 66 is defined by a "go" indicium 70 and a "no go" indicium 72 at opposite ends thereof. A spring 68 coacts with the indicator arm 56 to urge the latter forwardly in the direction of the gage blocks 16 and 18. In practice, the arm 56 moves forwardly under the action of spring 68 until it engages the lower gage block 18 (Fig. 2), and it normally occupies this position unless retracted in some manner as by engagement of a workpiece with the bridging portion 62.

The gage is adjusted initially by means of high and low-limit master parts referred to in the art as "set plugs." To adjust the gage, the high-limit plug is advanced between the gage blocks 16 and 18 until it pushes the indicator arm 56 to a position on the scale 66 where the terminal portions thereof register with the "go" indicia 70. This operation is performed with the screws 48 and 50 loosened sufficiently to permit adjustment of the studs 34 and 36; and when the plug is positioned as indicated above, the screw 52 is advanced to urge the lower gage block 18 with the desired pressure against the master plug. This position of the high-limit master plug is indicated by the dotted circle 74 in Fig. 2. After the high-limit position of the gage block 18 has been set, a low-limit plug is advanced between the gage blocks 16 and 18 and against the indicator arm 56 until it moves the terminal portions of the arm to the "no go" position 72 on the scale 66. Screw 54 is then tightened to urge the inner end of the gage block 18 with the desired pressure against the set plug. The position of the low-limit master plug is indicated by the dotted line 76 in Fig. 2. The two screws 48 and 50 are tightened to hold the gage block securely in the adjusted position, and the gage is set for operation.

In use, parts to be checked are inserted between the gage blocks 16 and 18 in the same manner as the master gage plugs. If the part being checked will not enter between the gage plugs sufficiently to actuate the indicator 56 the operator is immediately apprised that the part is larger than the maximum size permitted. Alternatively, if the part can be advanced between the gage blocks 16 and 18 sufficiently to move the indicator 56 beyond the "no go" position 72, the operator is apprised that the part is smaller than the minimum size permitted.

On the other hand, if the part can be advanced between the gage blocks 16 and 18 only sufficiently to move the indicator 56 to a position somewhere between the "go" and "no go'" limits of the scale 66, the operator immediately knows that the size of the part is correct and within the tolerance permitted for the part. There is some tendency for the body 10 to flex somewhat in use unless it is made inordinately large and heavy, and this deflection may affect the reading of the gage to a small but significant degree particularly when the gage blocks 16 and 18 are adjusted to measure exceedingly small tolerances. Under circumstances where this condition has an adverse effect on the operation of the gage, either one or both of the anvils 16 and 18 are provided on the confronting surfaces thereof with a plurality of relatively small, closely spaced, transverse grooves. Apparently these grooves co-operate with a workpiece disposed between the gage blocks 16 and 18 to relieve tension in the gage body 10. In any event, it has been observed that a gage body that will flex to a significant degree without the notches 77 will check workpieces accurately without flexure when the grooves 77 are provided. When using the gage the body 10 preferably is disposed with the gage blocks 16 and 18 uppermost and the workpiece is simply introduced between the gage blocks until it rests upon the blocks. When the workpiece is supported on the blocks in this manner and is not forced or jammed between the blocks the gage will register the size of the workpiece exceedingly accurately and will maintain a constancy of performance that is far superior to conventional gages of this type.

It is a feature of the invention that the instant gage not only informs the operator whether the part being checked is within the permitted tolerance range but it also tells him with essential preciseness the exact size of the part within this range. For example, if the gage is set to check a part having a diametrical dimension of $4''\pm.005''$, the operator knows that the part is exactly to size if it moves the indicator 56 half way between the "go" position 70 and the "no go" position 72. Further, since the scale 66 is graduated in equal increments between the "go" and "no go" positions, the operator can tell whether the part is larger than 4 inches or smaller than 4 inches and how much larger or smaller it actually is. This is a great advantage in many instances as compared to the operation of an ordinary snap gage which merely tells the operator whether the part is within a specified limit.

Preferably, the indicator 56 normally rests ahead of the "go" position 70 on the gage and it can be moved beyond the "no go" position 72. Thus, the gage is operative to show not only whether the part is within the permitted tolerance but also, if it is almost to size, how much to large or how much to small it is. This gives an inspector the opportunity to keep slightly oversize or undersize parts on a salvage basis in situations where this is permissible.

Another advantage of the gage here under consideration is that magnification increases automatically as the work tolerance decreases. Thus, the gage automatically becomes more accurate as the tolerance dimension becomes smaller. For example, if the gage is to be used to register a tolerance range of .0005" instead of .005" it is set or adjusted initially in the manner hereinabove described using master set plugs which differ in size by only .0005". In both instances, however, the high- and low-limit master plugs are moved to the same relative position between the gage blocks 16 and 18 in order to position the indicator 56 at the extreme limits of the scale 66. The only difference is that the included angle between the gaging surfaces 20 and 22 of the blocks 16 and 18 becomes smaller as the tolerance range decreases. Thus it will be apparent that the gage will register graduations in size within .0005 range as accurately as it will register dimensions within .005" range.

The fact that the gage is simple in construction is a decided advantage since this factor alone maintains manufacturing costs at a minimum and increases the life and reliability of the device. Inasmuch as the gage blocks 16 and 18 are made of hardened steel, there is no significant wear of the parts and the gage has an exceedingly long life. Also, the fact that the indicator 56 is actuated by the part itself is an advantage as operating difficulties encountered with in-between parts are eliminated.

Reference is now had to Fig. 4 which shows a modified gage embodying the invention. The gage there shown is identical to the one first described except that it has an adjustable upper gage block 80 and a fixed lower gage block 82, and in that the adjustable gage block 80 is fastened to the upper arm 12 of the gage body 10 by a transverse pivot 84. The block 80 is free to rock on the pivot 84 to vary the angular relation between the gage blocks 80 and 82. Set screws 86 and 88 provided in the arm 12 at opposite sides of the pivot 84 engage the block 80 adjacent the forward and rearward ends thereof. These pins take up any play in the pivot 84, and when both of the screws are tightened against the gage block they hold the latter securely in a selected adjusted position. The gage block 82 can be fastened to the lower arm 14 of the body 10 in any suitable manner. If desired, the gage block 82 can be fastened to the gage body in the same manner as the gage block 16 in the form of the invention first described.

This form of the invention is set or adjusted initially in the same manner as the first form of the invention. It functions in the same way and has the same advantages over prior known snap-gage constructions as the first form of the invention.

Attention is now directed to Fig. 5 which shows still another modified form of the invention. The gage shown in Fig. 5 is identical to the gage first described except that the gage blocks 16 and 18 are reversed and that the pivoted indicator 56 is replaced by a modified indicator 90. The indicator 90 comprises a sliding plunger 92 mounted at substantially the middle of the body 10 and substantially midway between the gage blocks 16 and 18. A coil spring 94 interposed between the body and an enlarged head 96 on the inner end of the plunger 92 normally urges the latter in the direction of the gage blocks for engagement by a part 98 to be checked. The gage body 10 is cut out as at 100 around the middle of the plunger and the portion of the latter which extends through the opening 100 is clearly visible. In this form of the invention, a scale 102 is marked on the portion of the plunger 92 which extends through the opening 100 and the scale 92 is provided with "go" and "no go" limits 104 and 106 in the same manner as the scale 66. Indicia here shown in the form of arrows 108 and 110 on the body at substantially the middle of the opening 100 cooperate with the scale 102 to register the size of the part 98 being checked.

It will be readily apparent that the gage of this invention is initially set or adjusted in the same manner as the gage first described and that the gage functions in the same manner to achieve the same results and has the same advantages as the first form of the invention.

Reference is now had to Figs. 6 and 7 which show a gage for checking externally threaded parts. This gage is identical to the form first described except that one of the gage blocks is extended forwardly beyond the other and in that the flat inner surfaces 20 and 22 are provided with parallel, longitudinal splines or teeth 120. In the particular construction shown, the upper gage block 16 is extended outwardly beyond the lower gage block 18. The teeth 120 are generally of rack-tooth form in cross section and they are shaped to fit snugly between and on the pitch line of the thread being checked. In the case of coarse threads one tooth 120 is provided for each interdental space between adjacent convolutions of the thread, but in the case of threads having an essentially fine pitch it is preferred to omit at least alternate teeth 120 in order to simplify manufacturing of the instrument. Thus, the teeth 120 constitute mating parts for the threads on the workpiece to be checked, and the teeth locate on the pitch diameter of the part. It is preferred that the teeth 120 be shaped so as to have at least a small amount of flank contact both above and below the actual pitch line so as to eliminate possible gage interference in case the thread form on the part is not properly formed or in case of interference as a result of burrs left on the part or dirt lodged between the contacting surfaces of the part and the gage. Manifestly, for maximum benefit the teeth 120 should have minimum flank contact with the threads on the work, but the contact should be sufficient so that the teeth present enough surface to assure a reasonable wear life.

This gage is used in substantially the same manner as the gage first described and it functions in the same way to achieve the same results. In order to permit parts to be checked rapidly and efficiently, however, it is necessary to provide some means to facilitate interengagement of the external threads on the workpiece and the teeth 120 on the gage blocks 16 and 18. In accordance with the present invention this is accomplished by extending the gage block 16 in the manner described. By reason of this construction it is possible to fit the thread on the workpiece with the teeth 120 on the extension merely by laying the part against the gage block extension. Thereafter, it is merely necessary to slide the workpiece inwardly on the teeth 120 of the upper gage block 16 and the latter holds the workpiece positioned properly for engagement with the teeth on the lower gage block 18. In use, the part is simply pushed into the gage until it stops on the taper between the two blocks 16 and 18 and the indicator 56 registers the size of the part within a tolerance range for which the gage is set.

The form of the invention shown in Figs. 8 and 9 is identical to the form first described except that the indicator 56 is replaced by a scale defined by graduations here shown in the form of grooves 130 cut into the side of the lower gage block 18. The graduations 130 comprise a scale having "go" and "no go" indicia 132 and 134. The gage is adjusted and initially set in the same manner as the first form of the invention but in this case the operator makes the necessary adjustments by aligning the points of tangency of the master plugs with the "go" and "no go" indicia 132 and 134. Also, in checking the production parts, the operator must observe the point of tangency of the part on the scale 130 in order to determine whether the part is of a proper size and the approximate size of the part within the tolerance range. A gage of this type is operative according to the present invention but obviously is more difficult to use and to this extent less desirable than the forms previously referred to.

The form of the invention shown in Figs. 10 and 11 is identical to the form shown in Figs. 8 and 9 except that a scale 140 similar to the scale 130 is provided on the upper gage block 16 instead of on the lower gage block 18. The scale 140 serves the same purpose as the scale 130 and the gage functions in the same manner to achieve the same results as the gage illustrated in Figs. 8 and 9.

Having thus described the invention, we claim:

1. A snap gage comprising a generally C-shaped body having spaced end portions, aligned gage blocks having confronting work-engaging surfaces disposed in acute angular relation and adapted to engage opposite sides of a workpiece inserted therebetween, mountings fastening said gage blocks to respective end portions of the body, and a visual indicator for registering the extent to which a workpiece can be inserted between said blocks, said indicator including a pointer pivoted to one arm of the body extending between said arms in proximity to said gage blocks and alongside the other arm of said body, said pointer positioned for direct engagement with and actuatable by a workpiece inserted between said gage blocks, and a scale co-operable with said pointer to give a visual reading of the inserted position of the workpiece.

2. A snap gage comprising a generally C-shaped body having spaced end portions, aligned gage blocks having confronting work-engaging surfaces disposed in acute angular relation and adapted to engage opposite sides of a workpiece inserted therebetween, mountings fastening said gage blocks to respective end portions of the body, at least one of said mountings including adjustable, flexible means for tilting the gage block associated therewith so as to vary the angle between the work-engaging surfaces of said gage blocks, and a visual indicator for registering the extent to which a workpiece can be inserted between said blocks, said indicator including a pointer pivoted to one arm of the body extending between said arms in proximity to said gage blocks and alongside the other arm of said body, said pointer positioned for direct engagement with and actuatable by a workpiece inserted between said gage blocks, and a scale co-operable with said pointer to give a visual reading of the inserted position of said workpiece.

3. A snap gage comprising a generally C-shaped body having spaced end portions, aligned gage blocks having confronting work-engaging surfaces disposed in acuate angular relation and adapted to engage opposite sides of a workpiece inserted therebetween, mountings fastening said gage blocks on respective end portions of the body including flexible reeds carrying one of said blocks, and individually adjustable to vary the angular relation between said blocks and a visual indicator for registering the extent to which a workpiece can be inserted between said blocks, said indicator including an arm pivoted on one arm of the body extending between said arms in proximity to said gage blocks, said pointer being directly engageable by a workpiece inserted between said gage blocks, and a scale having "go" and "no go" limits on the body and extending within the limits of pivotal movement of said arm, said arm being actuatable across said scale by a workpiece inserted between and in contact with said gage blocks and co-operating with said arm to give a visual reading of the inserted position of said workpiece.

4. A snap gage comprising a generally C-shaped body having spaced end portions, aligned gage blocks having confronting work-engaging surfaces adapted to engage opposite sides of a workpiece inserted therebetween, mountings fastening said gage blocks to respective end portions of the body, at least one of said mountings being adjustable to tilt the gage block associated therewith so as to vary the angular relation between the work-engaging surfaces of the blocks and including a pair of studs on the gage block extending rearwardly therefrom and longitudinally adjustable in said body, said studs having flexible portions permitting angular adjustment of the gage block by individual longitudinal adjustment of the studs, means for holding said studs in selected longitudinally adjusted positions in said body, and a visual indicator disposed to co-operate with a workpiece inserted between said gage blocks and in contact with both of said work-engaging surfaces to register the extent of insertion permitted by said blocks.

5. A snap gage comprising a generally C-shaped body having spaced end portions, aligned gage blocks having confronting work-engaging surfaces adapted to engage opposite sides of a workpiece inserted therebetween, mountings fastening said gage blocks to respective end portions of said body, at least one of said mountings being adjustable to tilt the gage block associated therewith so as to vary the angular relation between the work-engaging surfaces of the blocks and including a pair of studs on the gage block extending rearwardly therefrom and longitudinally adjustable in said body, said studs having flexible reed portions which permit angular adjustment of the gage block by individual longitudinal adjustment of the studs in said body, and means for holding said studs in selected longitudinally adjusted positions in the body, a visual indicator including a scale on the body having "go" and "no go" limits, a pivoted arm on the body positioned for engagement with a workpiece inserted between said gage blocks and having a portion disposed to sweep across said scale, said arm being actuatable by the workpiece and the degree of actuation being a function of the extent to which the workpiece can be inserted between said gage blocks, the mentioned portion of said arm co-operating with said scale to give a visual reading of the inserted position of the workpiece and an actual indication of the size of the workpiece within the tolerance range of the gage.

6. A snap gage comprising a generally C-shaped body having spaced end portions, aligned gage blocks having confronting work-engaging surfaces adapted to engage opposite sides of a workpiece inserted therebetween, said surfaces being inwardly convergent to limit the extent to which a workpiece can be inserted, mountings fastening said gage blocks to respective end portions of the body, at least one gage block having a plurality of relatively small closely spaced transverse grooves on the work engaging surface thereof, said grooves being engageable by a workpiece inserted between and against said blocks and operable to relieve said body of stresses and to prevent flexure thereof in use.

References Cited in the file of this patent

UNITED STATES PATENTS

| | | |
|---|---|---|
| 1,401,119 | Aldeborgh | Dec. 27, 1921 |
| 1,613,824 | Hanson | Jan. 11, 1927 |
| 2,436,528 | Polk | Feb. 24, 1948 |
| 2,657,921 | Macbride | Nov. 3, 1953 |

FOREIGN PATENTS

| | | |
|---|---|---|
| 321,742 | Germany | Feb. 28, 1919 |
| 136,427 | Great Britain | Dec. 18, 1919 |